June 2, 1942. W. HARRIS Re. 22,104
ART OF SIZING WARPS
Original Filed May 29, 1939
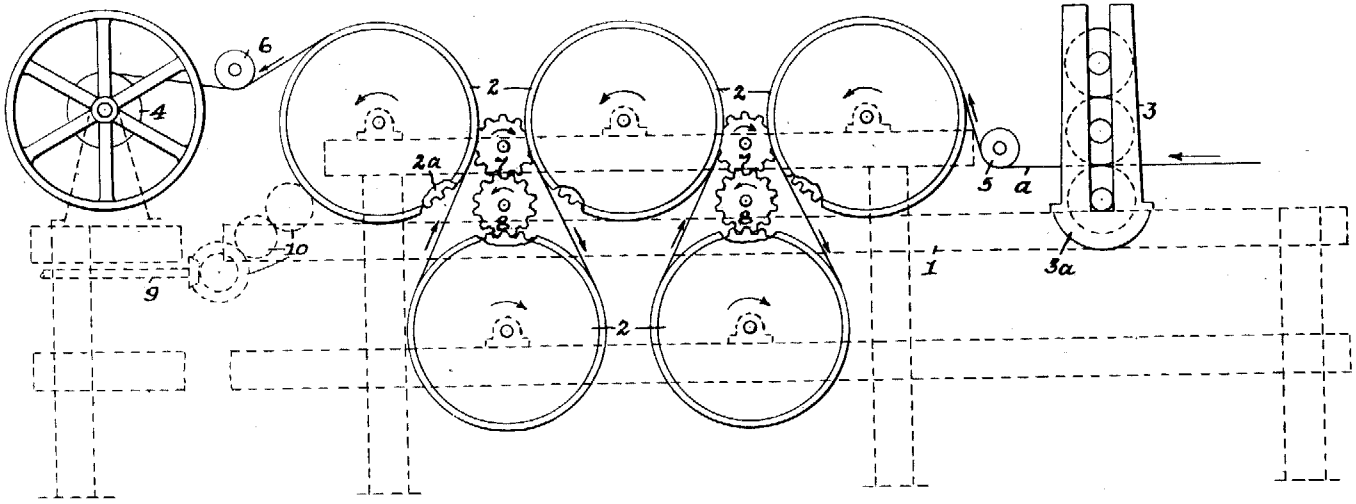
INVENTOR.
William Harris,
BY
John W. Stewart
ATTORNEY.

Reissued June 2, 1942

Re. 22,104

UNITED STATES PATENT OFFICE 22,104

ART OF SIZING WARPS

William Harris, Paterson, N. J.

Original No. 2,263,547, dated November 18, 1941, Serial No. 276,372, May 29, 1939. Application for reissue November 25, 1941, Serial No. 420,408

4 Claims. (Cl. 28—28)

Size in solution having been applied to a warp drying is effected by passing the warp lengthwise of itself in contact with a succession of rotary heated drums rotated respectively in the directions to advance the warp. The size solution is usually applied by a "quetch" while the warp is in transit to the drums. As delivered by the drums the warp is usually beamed, or wound on a beam.

The warp must come to the beam in completely dry state (or with the liquid of the size solution completely evaporated or dispelled) in the sense that at least the sized strands or threads will not adhere together and thus be likely to be broken or otherwise cause trouble when the warp is used in the weaving step.

Another factor which must be taken into account in the drying of sized warps composed of fibers of certain synthetic materials is that such fibers when wetted extend or readily yield to extension in length and when they are subjected to drying they contract in length. In drying a sized warp of this character it is known that the fibers of its strands or threads or the latter themselves are frequently broken or at least so weakened that they will break in the weaving operation. This has been because, being wetted and hence lengthened, they then undergo the drying step having their effort to contract opposed by the adhesion, with friction, between them and the succession of drums. One type of such synthetic material is what is known as "regenerated cellulose."

According to the present invention a warp thus characterized is directed lengthwise of itself and meanwhile wetted with a sizing solution and, at several successive points within a heated drying zone, it is supported within and tractively impelled in substantially completely exposed state therethrough at such different speeds that at each such point which succeeds another the speed will be constant but slower than at the next preceding such point and the warp-carried liquid will be substantially completely dispelled when the warp attains in its travel the last of such successive points. By following this procedure, as considerable practice has shown, the warp may be beamed without undue adhesion of its component strands in the beamed mass and undue breakage of the fibers or strands and even undue weakening thereof may be avoided whether during the procedure or afterwards.

To illustrate my invention I show in the accompanying drawing and in side elevation the drums of a so-called warp-sizing machine, the quetch and the beaming means (the frame appearing in broken outline); the drums are equipped with gearing designed to accomplish my purpose. However, it will be understood that the invention is fundamentally concerned with no particular means or mechanism, being essentially a method.

In the frame 1 of the machine are journaled the drums 2 in the arrangement shown, they being hollow and heated by steam admitted thereto, as disclosed for instance in the Johnson patent, No. 2,007,828. At 3 is the quetch here having three superposed rollers between two of which the warp extends, the lowest roller dipping in size solution in a tank 3*a*. At 4 is the beam on which to wind the treated warp. The warp *a* extends from the quetch alternately over and under the drums and to the beam; as usual there is a guiding roller 5 at the approach side and another guiding roller 6 at the discharge side of the drums.

The drums have gears 2*a*. Between each two upper drums and meshing with their gears is a pinion 7, and meshing with each such pinion and the corresponding lower drum-gear is a pinion 8. Thus an inter-geared system including the drums is formed. The drive for this system may be afforded by any rotary element, as 9, and act through any transmission means, as 10—see the Johnson patent aforesaid, merely for example.

The gearing is such, as by the gears 2*a* being so graduated from right to left (not shown) that the right-hand or first drum-gear has the least number of teeth, that the speeds of the drums are stepped down from right to left, or so that the first drum rotates at the greatest speed.

The mentioned drying zone in this example has its width coextensive with the length of the series of drums.

The temperature of the drums will of course be that necessary, as usual, to perform the treatment with exception, but whatever it is the drive 9 of the system is operated at such speed that at a given point in said zone (at latest at the point of delivery of the warp therefrom) the liquid (water) of the size solution will have become substantially completely evaporated or dispelled in the sense hereinbefore alluded to and anterior to that point the threads of the warp will be induced to contract. Meanwhile, since each drum relatively to the next succeeding drum is rotating at a superior speed, the warp will be impelled toward said point faster than it is at that point advanced, thus to permit the warp to contract; and in some cases, depending on the kind, nature or quality of the warp that is to be so accomplished that the contracting effort may expend itself substantially completely.

In drying certain sheet material, as paper, by passing it through a heated zone, it is known to impel the sheet at a greater speed at one point in its travel through said zone than at some point at which it is advanced and later passed thereby, thus to afford some allowance for its contraction or shrinkage. But so far as I know this step has not been employed in the sizing of a warp, and as indicated my method distinguishes from such known procedure in these further respects, to wit: that, it being a size in solution state that is applied to the warp and whose ultimate condition must be taken into account, the dispelling of the liquid thereof is substantially completed, in the sense herein indicated, at some point within the drying zone, and that, the heating being incidentally such that substantially complete contraction of the fibers is possible, the superior speed at which anterior to said point the warp is impelled to permit the contraction to ensue may be such, as in the case of some warps manifesting the hereinbefore indicated phenomenon, that the effort to contract may expend itself substantially completely.

In winding the warp on the beam, which may be driven in any way, the rotary speed of the beam is preferably so maintained that the warp will be wound on in more or less slack state so that if, as to vagrant threads of the warp, the size is not so completely dry that such threads would be sticky, the pressure incident to tension will not cause them to adhere to other threads.

Having thus fully described my invention, what I claim is:

1. The method of treating a warp of the class set forth which consists in directing the warp lengthwise of itself and meanwhile wetting it with a sizing solution and, at several successive points within a heated drying zone, supporting the warp within and at such several points also tractively impelling the same in substantially completely exposed state through said zone at such different speeds that at each of said points which succeeds another the speed will be constant but slower than at the next preceding point and the warp-carried liquid of the solution will be substantially completely dispelled when the warp attains in its travel the last of said successive points.

2. The method of treating a warp of the class set forth which consists in directing the warp lengthwise of itself and wetting it with a size solution and winding the warp in slack state and, at several successive points within a heated drying zone between the points of wetting and winding the warp, supporting the warp within and at such several points also tractively impelling the same in substantially completely exposed state through said zone at such different speeds that at each of said points which succeeds another the speed will be constant but slower than at the next preceding point and the warp-carried liquid of the solution will be substantially completely dispelled when the warp attains in its travel the last of said successive points.

3. The method of treating a warp of the class set forth which consists in directing the warp lengthwise of itself and meanwhile wetting it with a sizing solution and, at several successive points within a heated drying zone, supporting the warp within and at such several points also tractively impelling the same in substantially completely exposed state through said zone at such different speeds that at each of said points which succeeds another the speed will be constant but slower than at the next preceding point and the warp-carried liquid of the solution will be substantially completely dispelled when the warp attains in its travel the last of said successive points and the contracting effort of the portion of the warp at any time within said zone and anterior to the latter point, may expend itself substantially completely.

4. The method of treating the warp of the class set forth which consists in directing the warp lengthwise of itself and wetting it with a size solution and winding the warp in slack state and, at several successive points within a heated drying zone between the points of wetting and winding the warp, supporting the warp within and at such several points also tractively impelling the same in substantially completely exposed state through said zone at such different speeds that at each of said points which succeeds another the speed will be constant but slower than at the next preceding point and the warp-carried liquid of the solution will be substantially completely dispelled when the warp attains in its travel the last of said successive points and the contracting effort of the portion of the warp at any time within said zone and anterior to the latter point may expend itself substantially completely.

WILLIAM HARRIS.